(12) United States Patent
Iwaki

(10) Patent No.: US 6,282,058 B1
(45) Date of Patent: *Aug. 28, 2001

(54) BELT-TYPE TAPE CARTRIDGE WITH INCREASED MAGNETIC TAPE CAPACITY

(75) Inventor: Yuji Iwaki, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,624

(22) Filed: May 11, 1998

(30) Foreign Application Priority Data

May 15, 1997 (JP) ................................ 9-125176

(51) Int. Cl.$^7$ ................................ G11B 23/02
(52) U.S. Cl. ................................ 360/132
(58) Field of Search ................................ 360/132, 134; 242/342

(56) References Cited

U.S. PATENT DOCUMENTS

| | | | |
|---|---|---|---|
| 3,692,255 | * 9/1972 | Behren | 242/343.2 |
| 4,172,569 | * 10/1979 | Newell | 242/343.2 |
| 4,863,114 | * 9/1989 | Moeller et al. | 242/188 |
| 5,287,240 | * 2/1994 | Koizumi et al. | 360/132 |
| 5,348,243 | * 9/1994 | Ohmachi et al. | 360/60 X |
| 5,362,009 | * 11/1994 | Howard, Jr. et al. | 242/342 |
| 5,397,072 | * 3/1995 | Schoeppel et al. | 242/352.4 |
| 5,610,788 | * 3/1997 | Standiford et al. | 360/132 |
| 5,722,610 | * 3/1998 | Smith et al. | 242/342 |
| 5,757,579 | * 5/1998 | Koizumi | 360/96.5 |
| 5,777,830 | * 7/1998 | Wrobel et al. | 360/132 |
| 5,886,845 | * 3/1999 | Kilaparti et al. | 360/69 |

\* cited by examiner

*Primary Examiner*—Jefferson Evans
*Assistant Examiner*—Angel Castro
(74) *Attorney, Agent, or Firm*—Oblon, Spivak, McClelland, Maier & Neustadt, P.C.

(57) ABSTRACT

A tape cartridge comprising a base plate and a cover fixed to the base plate to define a closed space housing first and second hubs, first and second tape guides, a drive roller and first and second corner rollers all of which are mounted on the base plate. A magnetic tape is unwound from one of the first and second hubs, guided by the first and second tape guides and wound on the other hub. The drive roller is located between the first and second tape guides for driving a drive belt looped on its tape winding surface. The drive belt is also looped on the tape winding surfaces of the first and second corner rollers. The first corner roller is located to hold the drive belt in contact with a peripheral surface of the first hub and the second corner roller is located to hold the drive belt in contact with a peripheral surface of the second hub. The first hub has its rotation axis spaced at a first distance with respect to the tape winding surface of the drive roller and at a second distance with respect to the tape winding surface of the first corner roller. The first distance is substantially equal to the second distance. The second hub has its rotation axis spaced at a third distance with respect to the tape winding surface of the drive roller and at a fourth distance with respect to the tape winding surface of the second corner roller. The third distance is substantially equal to the fourth distance.

4 Claims, 9 Drawing Sheets

BELT-TYPE TAPE CARTRIDGE WITH INCREASED MAGNETIC TAPE CAPACITY

BACKGROUND OF THE INVENTION

This invention relates to a belt drive tape cartridge for storage of magnetic tape and the like used with a computer as an external recording medium.

Conventional drive belt type tape cartridges include standard-sized tape cartridges and small-sized (mini) tape cartridges. Although such mini tape cartridges offer the advantages of reduced size and weight, they have been demanded to have a greater memory capacity. It may be possible to increase the memory capacity of the mini tape cartridge by changing the memory format of the magnetic tape. However, the conventional drive unit cannot read and record data with the changed memory format. Alternatively, it may be possible to increase the memory capacity of the mini tape cartridge by increasing the length of the magnetic tape. However, it is difficult to increase the length of the magnetic tape without changing the size of the base plate since the base plate is crowded with elements such as hubs, tape guides, corner rollers and the like.

SUMMARY OF THE INVENTION

It is a main object of the invention to provide an improved mini tape cartridge which can contain an increased maximum diameter of magnetic tape wound around one of first and second hubs without increasing the size of the base plate of the tape cartridge.

There is provided, in accordance with the invention, a tape cartridge comprising a base plate, a cover fixed to the base plate to define a closed space, a first hub mounted on the base plate for rotation about a rotation axis thereof within the closed space, a second hub mounted on the base plate for rotation about a rotation axis thereof within the closed space, a magnetic tape unwound from one of the first and second hubs and wound on the other hub, first and second tape guides mounted on the base plate to guide the magnetic tape unwound from the one hub, a drive roller mounted on the base plate between the first and second tape guides for driving a drive belt. The drive belt has a tape winding surface on which the drive belt is looped. The tape cartridge also includes first and second corner rollers mounted on the base plate for guiding the drive belt. The first corner roller has a tape winding surface on which the drive belt is looped. The first corner roller is located to hold the drive belt in contact with a peripheral surface of the first hub. The second corner roller has a tape winding surface on which the drive belt is looped. The second corner roller is located to hold the drive belt in contact with a peripheral surface of the second hub. The rotation axis of the first hub is spaced at a first distance with respect to the tape winding surface of the drive roller and at a second distance with respect to the tape winding surface of the first corner roller. The first distance is substantially equal to the second distance. The rotation axis of the second hub is spaced at a third distance with respect to the tape winding surface of the drive roller and at a fourth distance with respect to the tape winding surface of the second corner roller. The third distance is substantially equal to the fourth distance.

BRIEF DESCRIPTION OF THE DRAWINGS

This invention will be described in greater detail by reference to the following description taken in connection with the accompanying drawings, in which.

DETAILED DESCRIPTION OF THE INVENTION

Prior to the description of the preferred embodiments of the invention, the prior art tape cartridge of FIGS. 6 to 9 are briefly described in order to provide a basis for a better understanding of the difficulties attendant thereon.

Figure 6:
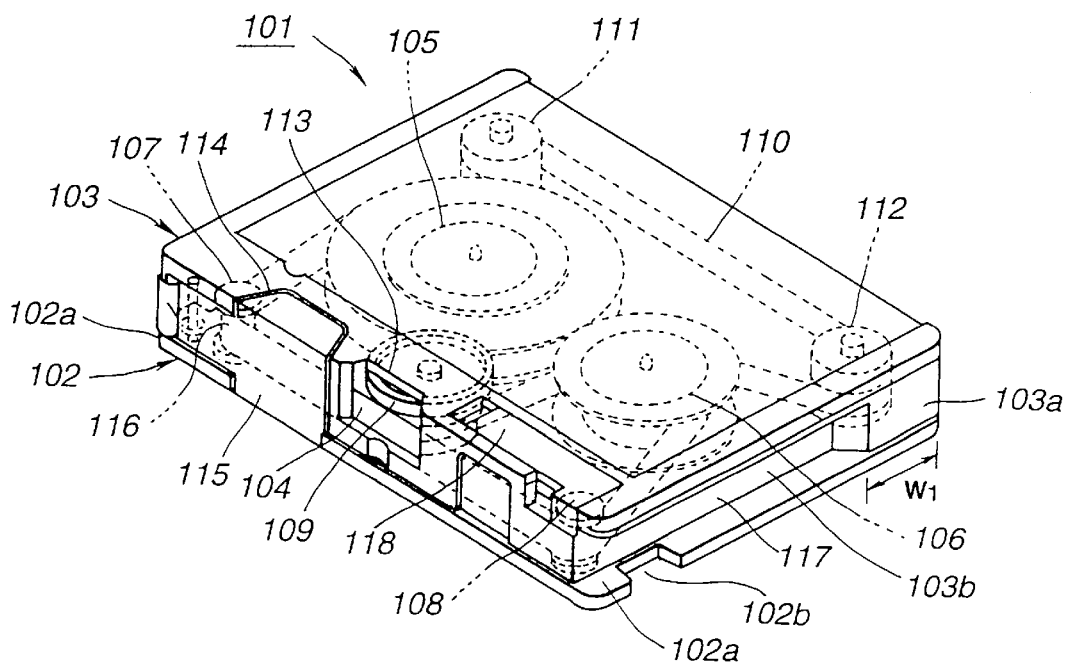
FIG. 6 is a perspective view showing a prior art tape cartridge.

FIG. 6 shows a conventional tape cartridge for storage of magnetic tape and the like used with a computer as an external recording medium for data backup. The conventional tape cartridge, designated generally by the reference numeral 101, includes a base plate 102 and a cover 103 which are snapped together and sealed during assembly of the tape cartridge unit elements. The base plate 102 provided on its upper surface with first and second hubs 105 and 106. A magnetic tape 104 is unwound from one hub, guided by first and second tape guides 107 and 108 to be threaded across the front edge of the cover 103 where it is exposed to a read-record head of a tape recorder (not shown) and wound on the other hub. A constant rate running of the magnetic tape 104 is effected by a drive belt 110 which extends around a drive roller 109 located on the upper surface of the base plate 102 between the first and second tape guides 107 and 108 and also loops around first and second corner rollers 111 and 112. The first corner roller 111 is located near one corner of the base plate 102 to hold the drive belt 110 in pressure contact with the peripheral surface of the first hub 105. The second corner roller 112 is located near another corner of the base plate 102 to hold the drive belt 110 in pressure contact with the peripheral surface of the second hub 106. The cover 103 is formed in its front edge surface intermediate its ends with a roller window 113 through which the drive roller 109 is exposed. A head window 114 is formed in the front edge surface of the cover 103 on one side of the roller window 113. The head window 114 is associated with a rotary door 115 urged in the direction closing the head window 114 under the resilient force of a coil spring 116. The cover 103 is shaped on its opposite sides as illustrated to have wide and narrow portions 103a and 103b with grooves 117 formed partially in the opposite side surfaces thereof. The lower wall of each of the grooves 117 has a cutout 102b formed therein to provide a front end projection 102a.

Figure 7:
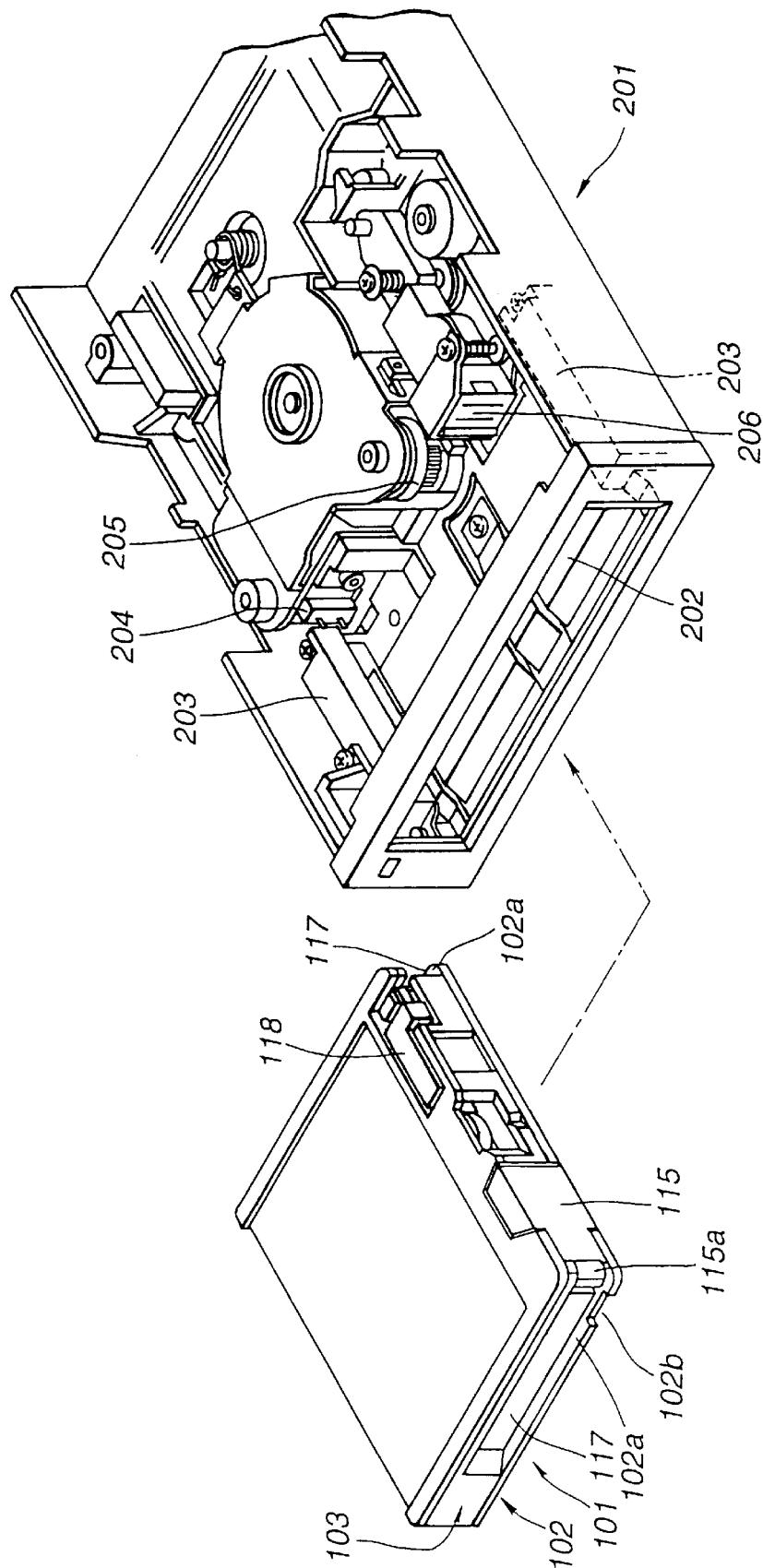
FIG. 7 is a perspective view of a drive unit for use with the prior art tape cartridge.
Figure 8:
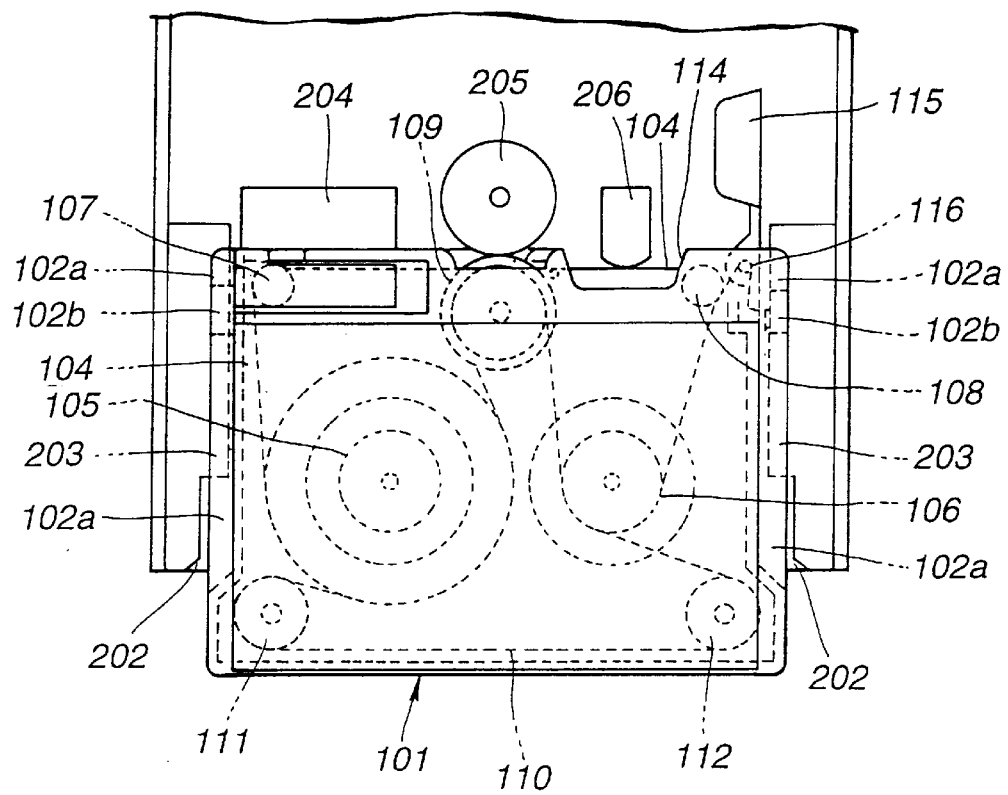
FIG. 8 is a plan view of the prior art tape cartridge retained in position within a drive unit.
Figure 9:
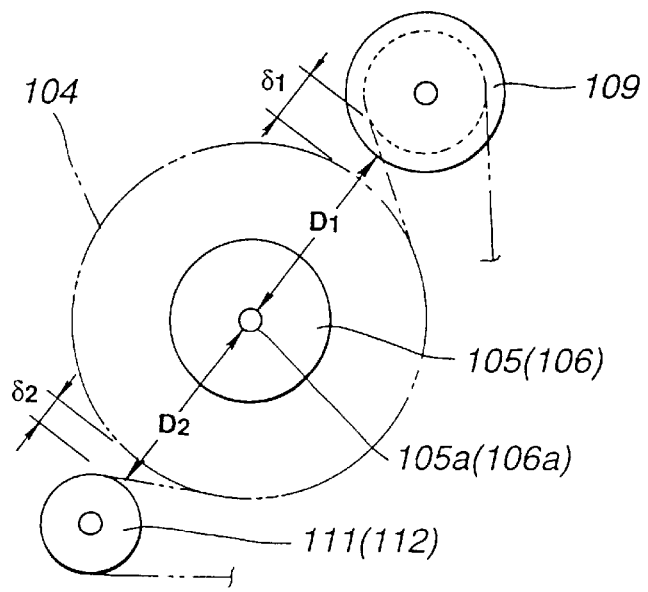
FIG. 9 is an enlarged plan view showing a significant portion of the prior art tape cartridge.

The tape cartridge 101 is used in a read-record unit (referred hereinafter to as a drive unit) 201 as shown in FIG. 7. The drive unit 201 includes a cartridge receptor 202, base plate retainers 203 provided at lower positions on the opposite side of the cartridge receptor 202, a detector 204 provided at the rear end of the cartridge receptor 202 for detecting the insertion of the tape cartridge 101 and the position of the magnetic tape, a drive capstan roller 205 and a magnetic head 206. When the tape cartridge 101 is inserted into the drive unit 201 toward the cartridge receptor 202, a door release member (not shown) provided on one side of the cartridge receptor 202 pushes the tongue 115a of the rotary door 115 to open the head window 114 formed in the front surface of the cover 103. The base plate retainers 203 provided on the opposite sides of the cartridge receptor 202 retain the upper surfaces of the opposite sides 102a of the base plate 202 while positioning members (not shown) provided in the drive unit 201 is held in engagement with the respective cutouts 102b of the opposite sides 102a of the base plate 202 to retain the tape cartridge unit 101 in position within the drive unit 201. When the tape cartridge 101 is fixed in position within the drive unit 201, the detector 202 detects the tape cartridge 101 charged in the drive unit 201. In this charged position, the drive roller 109 is in contact with the drive capstan roller 205 and the magnetic tape 104 is in contact with the magnetic head 206.

The conventional drive belt type tape cartridges include standard-sized tape cartridges and small-sized tape cartridges. The small-sized tape cartridges are referred to as mini tape cartridges. Table 1 shows the specifications of the standard- and small-sized tape cartridges for comparison with each other.

TABLE 1

|  | Standard-Sized Cartridge | Small-Sized Cartridge |
| --- | --- | --- |
| Case Size | 152.4 × 101.6 × 17.15 | 80.98 × 61.11 × 14.73 |
| Tape Length | about 600–1000 | about 400 |
| Memory Capacity | 150 MB–25 GB | 220 MB–2 GB |

The memory capacity depends on the memory format, such as, for example, wound tape amount, tape running speed, bit density.

Although such mini tape cartridges offer the advantages of reduced size and weight, they have been demanded to have a greater memory capacity. It may be possible to increase the memory capacity of the mini tape cartridge by changing the memory format of the magnetic tape. However, the conventional drive unit cannot read and record data with the changed memory format. Alternatively, it may be possible to increase the memory capacity of the mini tape cartridge by increasing the length of the magnetic tape. However, it is difficult to increase the length of the magnetic tape without changing the size of the base plate since the base plate is crowded with elements such as hubs, tape guides, corner rollers and the like.

From careful observations of the conventional mini tape cartridges, the inventor has discovered that the conventional mini tape cartridges are disadvantageous in the following respects:

First, the distance D1 (FIG. 9) of the tape winding surface of the drive roller 109 with respect to the axis 105a or 106a of rotation of the first or second hub 105 or 106 is greater than the distance D2 (FIG. 9) of the tape winding surface of the first or second corner roller 111 or 112 with respect to the axis 105a or 106a of rotation of the first or second hub 105 or 106. Thus, the maximum diameter of the magnetic tape 104 wound around the first or second hubs 105 or 106 is determined by the smaller distance D2. When a maximum amount of magnetic tape 104 is wound around the first or second hub 105 or 106, as indicated by the two-dotted circle of FIG. 9, a gap δ 1 exists between the magnetic tape 104 and the drive roller 109. The gap δ 1 is greater than the gap δ 2 between the magnetic tape 104 and the first or second corner roller 111 or 112. Because of the unbalanced relationship between the gaps δ 1 and δ 2, the maximum diameter of the magnetic tape 104 wound around the first or second hub 105 or 106 is limited to a small value.

Second, the wide portion 103a of the cover 103 has a small width W1 (FIG. 6) on the side of the first and second corner rollers 111 and 112. The first and second hubs 105 and 106 are positioned on the side of the narrow portion 103b of the cover 103. This also limits the maximum diameter of the magnetic tape 104 wound around the first or second hub 105 or 106.

Figure 1:
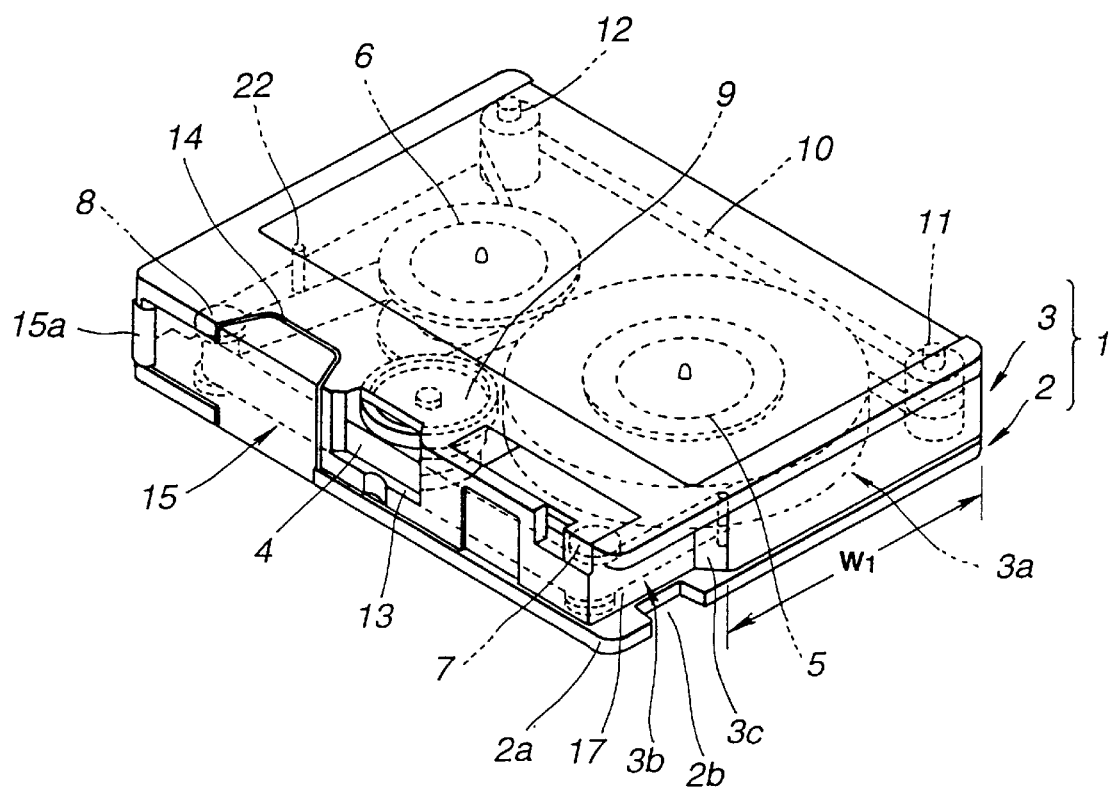
FIG. 1 is a perspective view showing one embodiment of a tape cartridge made in accordance with the invention.

Referring to FIG. 1, there is shown a tape cartridge embodying the invention. The tape cartridge, generally designated by the reference numeral 1, includes a base plate 2 and a cover 3 which are snapped together and sealed during assembly of the tape cartridge elements. The base plate 2 is substantially the same in shape and size as the base plate 102 of the conventional tape cartridge 101 of FIG. 6. The cover 3 is substantially the same in shape and size as the cover 103 of the conventional tape cartridge 101 of FIG. 6 except that the cover 3 has a wide portion 3a expanding near the first and second tape guides 7 and 8, as shown in FIG. 1. Thus, the wide portion 3a has a width W1 much greater than that of the narrow portion 3a of the cover 3.

Figure 2:
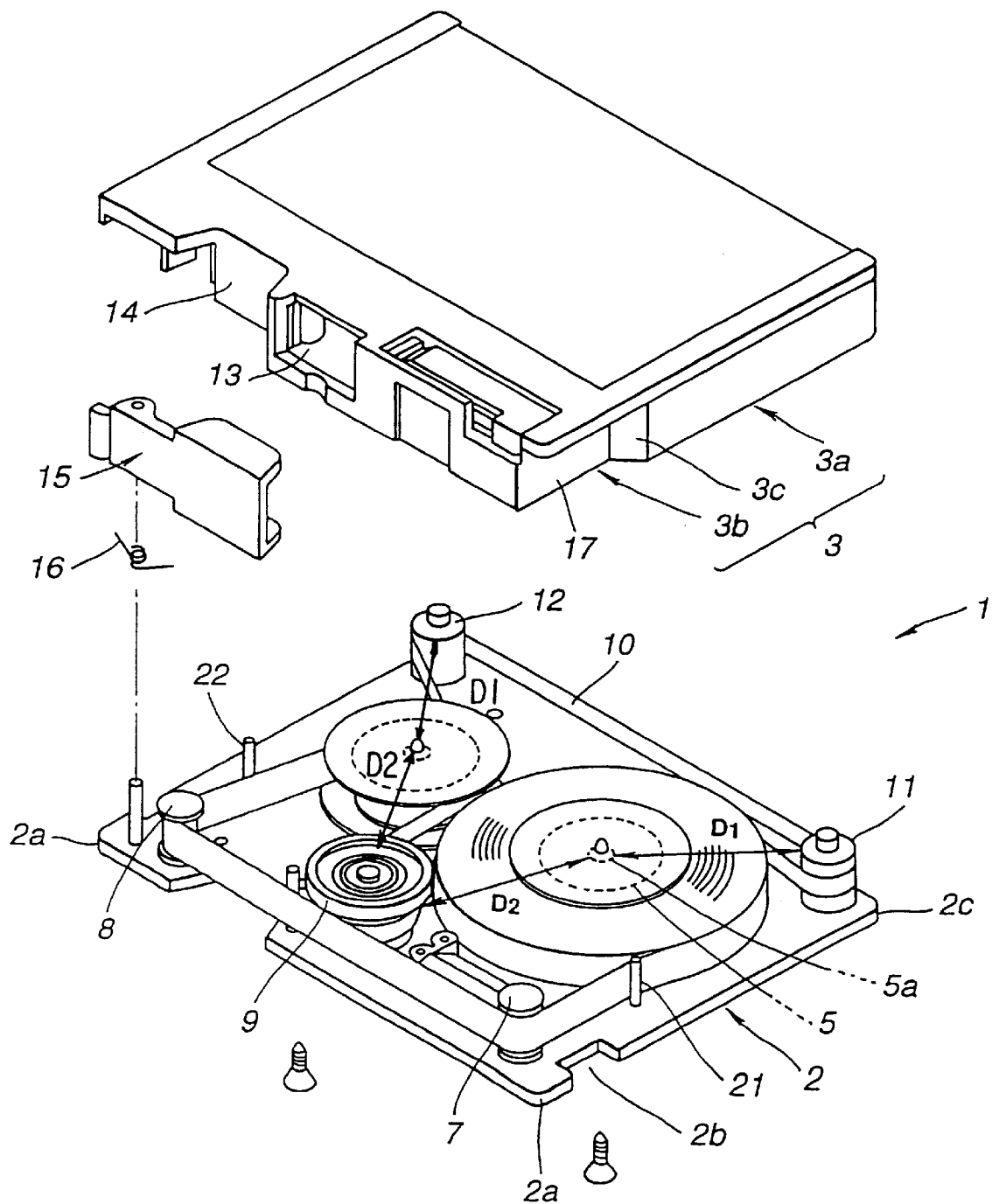
FIG. 2 is an exploded perspective view of the tape cartridge of FIG. 1.

As best shown in FIG. 2, the base plate 2 is provided on its upper surface with first and second hubs 5 and 6. A magnetic tape 4 is unwound from one of the hubs 5 and 6, guided by first and second tape guides 7 and 8 to be threaded across the front edge of the cover 3 where it is exposed to a read-record head of a tape recorder (not shown) and wound on the other hub. A constant rate running of the magnetic tape 4 is effected by a drive belt 10 which extends around a drive roller 9 located on the upper surface of the base plate 2 between the first and second tape guides 7 and 8 and also loops around first and second corner rollers 11 and 12. The first corner roller 11 is located near one corner of the base plate 2 to hold the drive belt 10 in pressure contact with the peripheral surface of the first hub 5. The second corner roller 12 is located near another corner of the base plate 2 to hold the drive belt 10 in pressure contact with the peripheral surface of the second hub 6. The first and second hubs 5 and 6, the first and second tape guides 7 and 8 and the drive roller 9 are substantially the same in shape and size as the first and second hubs 105 and 106, the first and second tape guides 107 and 108 and the driver roller 109 of the conventional tape cartridge 101, respectively.

The first and second corner rollers 11 and 12 have a diameter smaller than that of the first and second corner rollers 111 and 112 of the conventional tape cartridge 101. In this case, the diameter of the corner rollers 11 and 12 is 8 mm. The first and second tape guides 7 and 8 and the drive roller 9 are located substantially at the same positions as the first and second tape guides 107 and 108 and the driver roller 109 of the conventional tape cartridge 101, respectively. Each of the first and second corner rollers 11 and 12 is located at a position closer, by an amount corresponding to the decrease of the diameter of the first and second corner rollers 11 and 12, to the corresponding corner 2c of the base plate 2 than the first and second corner rollers 111 and 112 of the conventional tape cartridge 101. The distance of the driver roller 9 with respect to each of the first and second corner rollers 11 and 12 is greater than the distance of the driver roller 109 with respect to each of the first and second corner rollers 111 and 112 of the conventional tape cartridge 101.

The first and second hubs 5 and 6 are located on the base plate 2 in such a manner that their rotation axes 5a and 6a are positioned intermediate between the driver roller 9 and the corresponding one of the first and second corner rollers 11 and 12. The distance D1 (FIG. 2) of each of the rotation axes 5a and 6a of the respective hubs 5 and 6 with respect to the tape winding surface of the corresponding one of the first and second corner rollers 11 and 12 is substantially the same as the distance D2 (FIG. 2) of each of the rotation axes 5a and 6a of the first and second hubs 5 and 6 with respect to the tape winding surface of the drive roller 9.

The cover 3 includes a wide portion 3a, a narrow portion 3b and a stepped portion 3c connected between the wide and narrow portions 3a and 3b. The wide portion 3a has an outer size substantially the same as that of the base plate 2. The narrow portion 3b has an outer size smaller than that of the base plate so that the base plate 2 has front edges 2a and cutouts 2b exposed on the opposite sides thereof. The stepped portion 3c is positioned between the first and second hubs 5 and 6 and the first and second tape guides 7 and 8.

Figure 3:
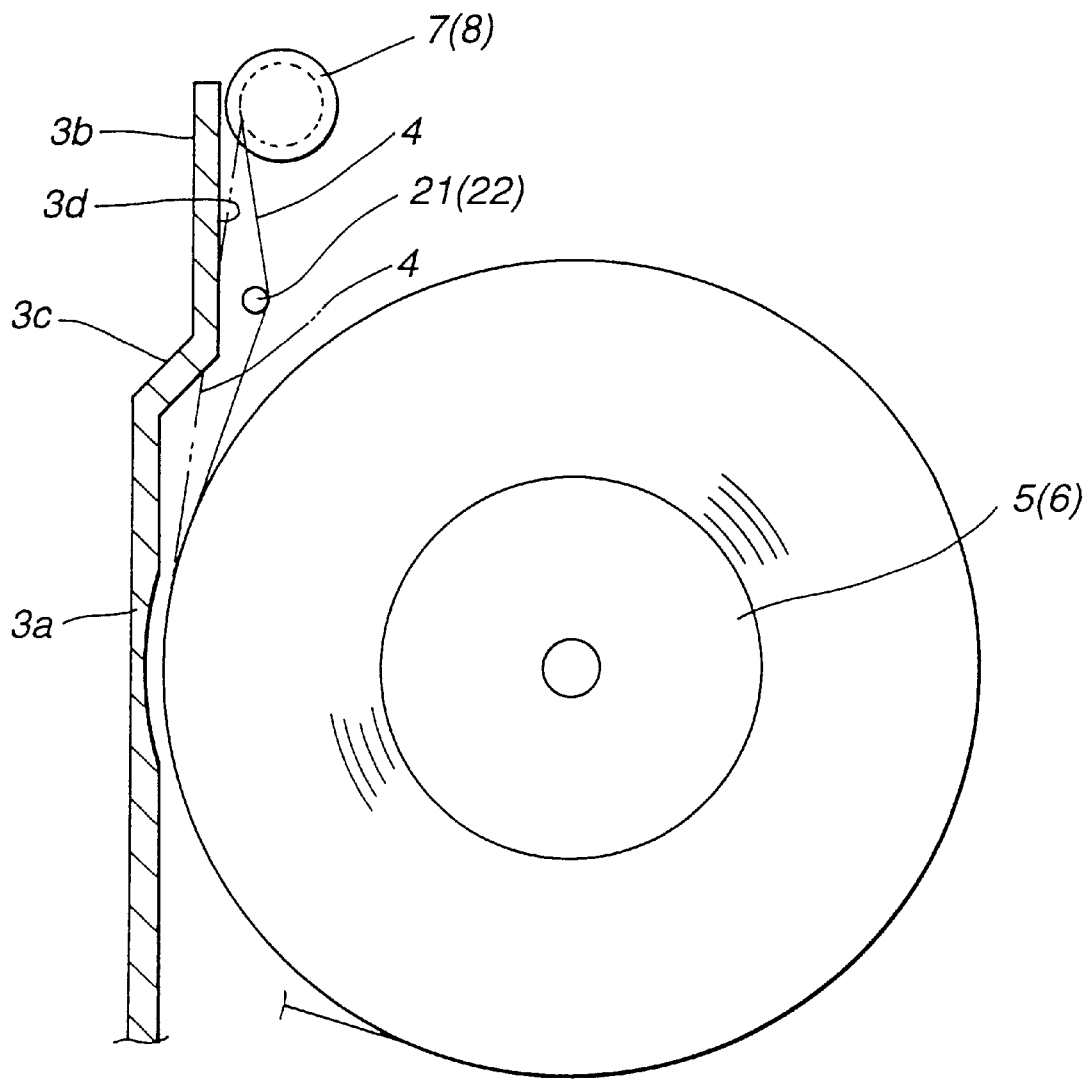
FIG. 3 is a fragmentary plan view showing a significant portion of the tape cartridge of FIG. 1.

As indicated by the two-dotted line of FIG. 3, the narrow portion 3b is located at such a position that the magnetic tape 4 comes into contact with the inner surface 3d of the narrow portion 3b when the amount of the magnetic tape 4 wound around the first or second hub 5 or 6 exceeds a predetermined value. The magnetic tape 4 will be damaged if the magnetic tape 4 runs with its surface held in contact with the inner surface 3d of the narrow portion 3b. In order to avoid such damage to the magnetic tape 4, third and fourth tape guides 21 and 22 are provided between the first and second hubs 5 and 6 and the first and second tape guides 7 and 8 to prevent the magnetic tape 4 from coming into contact with the inner surface 3d of the narrow portion 3b. The third and fourth tape guides 21 and 22 are located near the inside surface 3d of the narrow portion 3b. When the amount of the magnetic tape 4 wound around the first or second hub 5 or 6 exceeds a predetermined value, that is, when the possibility exists that the magnetic tape 4 comes into contact with the inner surface 3d of the narrow portion 3b, the corresponding one of the third and fourth tape guides 21 and 22 contacts with the outer peripheral surface of the magnetic tape to restrict its position in a manner to prevent the magnetic tape 4 from contacting with the inner surface 3d of the narrow portion 3b.

Returning to FIG. 2, the cover 3 is formed in its front edge surface intermediate its ends with a roller window 13 through which the drive roller 9 is exposed. A head window 14 is formed in the front edge surface of the cover 3 on one side of the roller window 13. The head window 14 is associated with a rotary door 15 urged in the direction closing the head window 14 under the resilient force of a coil spring 16.

Figure 4:
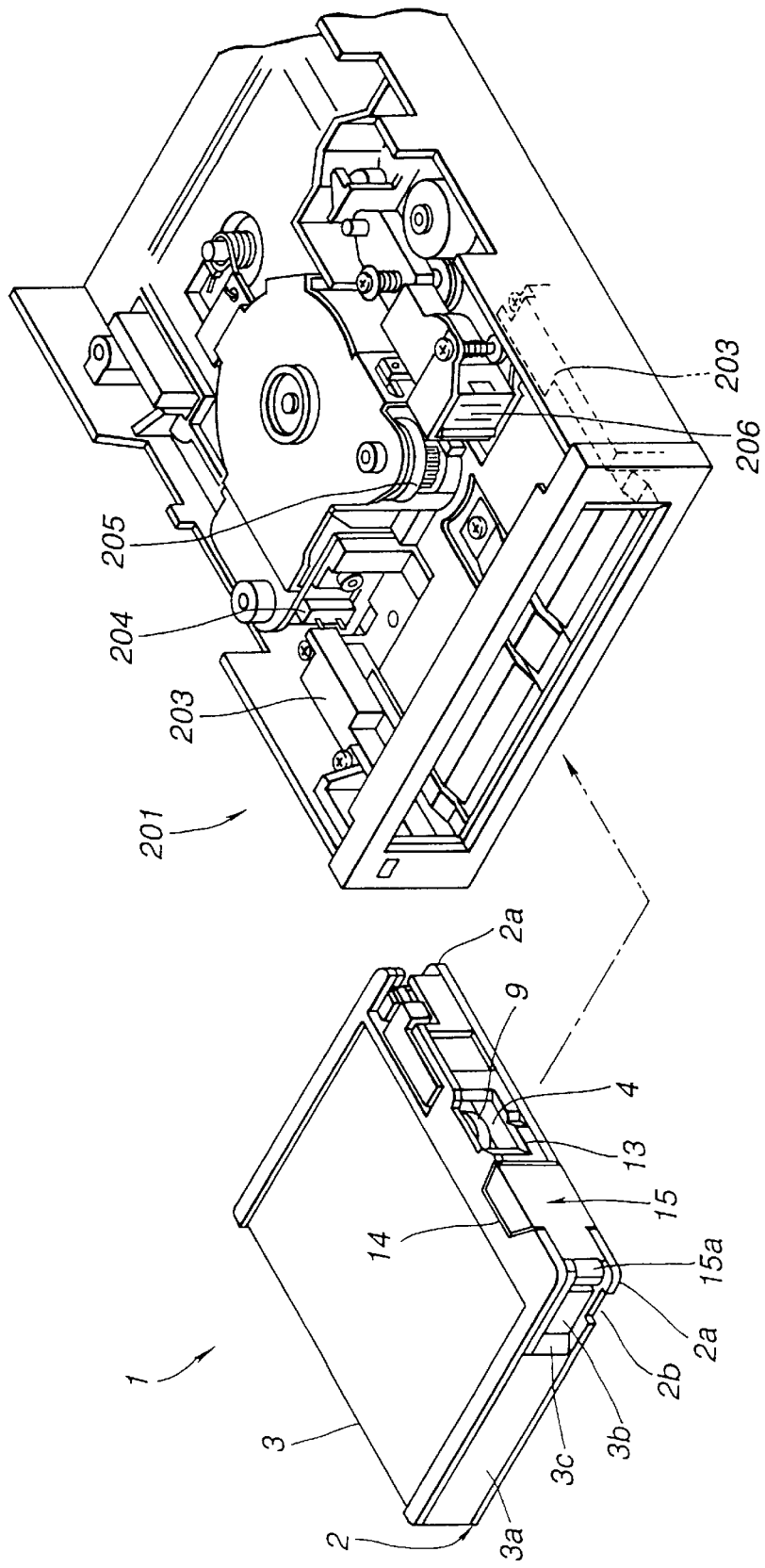
FIG. 4 is a perspective view of a drive unit for use with the tape cartridge.
Figure 5:
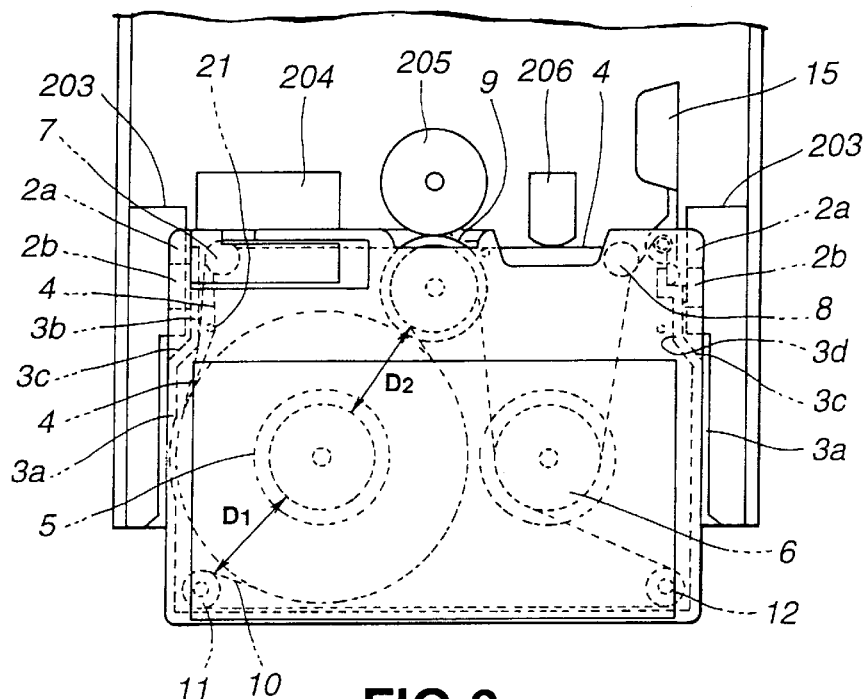
FIG. 5 is a plan view of the tape cartridge retained in position within the drive unit.

The tape cartridge 1 is used with a drive unit 201 as shown in FIG. 4. The drive unit 201 is substantially the same as described in connection with the conventional drive unit 201 of FIG. 7 except that the base plate retainer 203 has a length shorter than the base plate retainer 203 of the conventional drive unit 201. Accordingly, like parts are designated by like reference numerals and a detailed description will be omitted to avoid duplicity.

The operation is as follows: When the tape cartridge 1 is inserted into the drive unit 201 toward the cartridge receptor 202, the door release member (not shown) provided on one side of the cartridge receptor 202 pushes the tongue 15a of the rotary door 15 to open the head window 14 formed in the front surface of the cover 3. The base plate retainers 203 provided on the opposite sides of the cartridge receptor 202 retain the upper surfaces of the opposite sides 2a of the base plate 2 while positioning members (not shown) provided in the drive unit 201 is held in engagement with the respective cutouts 2b of the opposite sides 2a of the base plate 2 to retain the tape cartridge 1 in position within the drive unit 201. When the tape cartridge 1 is fixed in position within the drive unit 201, the detector 202 detects the tape cartridge 1 charged in the drive unit 201. In this charged position, the drive roller 9 is in contact with the drive capstan roller 205 and the magnetic tape 4 is in contact with the magnetic head 206.

When a record or head command is produced, the drive capstan roller 205 rotates. The rotation of the drive capstan roller 205 is transmitted to the drive roller 9 which thereby moves the drive belt 10 to run the magnetic tape 4. The diameter of the first and second corner rollers 11 and 12 around which the drive belt 10 is looped is 8 mm and smaller than the diameter (about 11 mm) of the corner rollers 111 and 112 of the conventional tape cartridge 101. Since the invention permits the magnetic tape 4 to run with a smaller radius of curvature than does the conventional tape cartridge, it is possible to increase the belt tension (drive force) exerted on the drive belt 10 so as to increase the tape tension exerted on the magnetic tape 4.

It is now assumed that the magnetic tape is unwound from the first hub 5 and wound around the second hub 6. When the amount of the magnetic tape 4 wound around the first hub 5 exceeds a predetermined value, the magnetic tape 4 unwound from the first hub 5 is in contact with the third tape guide 21 which prevents the magnetic tape 4 from coming into contact with the inner surface 3d of the narrow portion 3b of the cover 3. When the amount of the magnetic tape 4 wound around the first hub 5 decreases below the predetermined value, the magnetic tape 4 comes out of contact from the third tape guide 21. When the amount of the magnetic tape 4 wound around the second hub 6 exceeds a predetermined value, the magnetic tape 4 to the second hub 6 comes into contact with the fourth tape guide 22 which prevents the magnetic tape 4 from coming into contact with the inner surface 3d of the narrow portion 3b of the cover 3.

According to the invention, the tape cartridge comprises a base plate, a cover fixed to the base plate to define a closed space, a first hub mounted on the base plate for rotation about a rotation axis thereof within the closed space, a second hub mounted on the base plate for rotation about a rotation axis thereof within the closed space, a magnetic tape unwound from one of the first and second hubs and wound on the other hub, first and second tape guides mounted on the base plate to guide the magnetic tape unwound from the one hub, a drive roller mounted on the base plate between the first and second tape guides for driving a drive belt. The drive belt has a tape winding surface on which the drive belt is looped. The tape cartridge also includes first and second corner rollers mounted on the base plate for guiding the drive belt. The first corner roller has a tape winding surface on which the drive belt is looped. The first corner roller is located to hold the drive belt in contact with a peripheral surface of the first hub. The second corner roller has a tape winding surface on which the drive belt is looped. The second corner roller is located to hold the drive belt in contact with a peripheral surface of the second hub. The rotation axis of the first hub is spaced at a first distance with respect to the tape winding surface of the drive roller and at a second distance with respect to the tape winding surface of the first corner roller. The first distance is substantially equal to the second distance. The rotation axis of the second hub is spaced at a third distance with respect to the tape winding surface of the drive roller and at a fourth distance with respect to the tape winding surface of the second corner roller. The third distance is substantially equal to the fourth distance. According to the invention, the distance of the magnetic tape wound on the first hub with respect to the drive roller is substantially equal to the distance of the magnetic tape wound on the first hub with respect to the first corner roller. Similarly, the distance of the magnetic tape wound on the second hub with respect to the drive roller is substantially equal to the distance of the magnetic tape wound on the second hub with respect to the second corner roller. Therefore, the claimed tape cartridge can contain a greater amount of magnetic tape than in the conventional tape cartridge.

Preferably, the cover includes a wide portion having a width substantially equal to the width of the base plate, a narrow portion having a width smaller than the width of the base plate, and a stepped portion between the wide and narrow portions. The stepped portion is located between the first and second hubs and the first and second tape guides. The narrow portion has an inner side surface contacting with the magnetic tape wound on the corresponding one of the first and second hubs in amount exceeding a predetermined value. This structure permits the cover to have its inner surface spaced at a greater distance with respect to the first and second hubs than in the conventional tape cartridge. It is, therefore possible to contain a greater amount of magnetic tape than in the conventional tape cartridge.

Preferably, the tape cartridge includes a third tape guide mounted on the base plate between the first hub and the first tape guide for retaining the magnetic tape out of contact from the inner side surface of the narrow portion when the magnetic tape is wound on the first hub in amount exceeding the predetermined value, and a fourth tape guide mounted on the base plate between the second hub and the second tape guide for retaining the magnetic tape out of contact from the inner side surface of the narrow portion when the magnetic tape is wound on the second hub in amount exceeding the predetermined value. The third and fourth tape guides can hold the magnetic tape out of contact from the inner surface of the stepped portion of the cover.

Preferably, the third tape guide is located at a position contacting with an outer peripheral surface of the magnetic tape when the magnetic tape is wound on the first hub in amount exceeding the predetermined value and the fourth tape guide is located at a position contacting with an outer peripheral surface of the magnetic tape when the magnetic tape is wound on the second hub in amount exceeding the predetermined value. Since third tape guide is held out of contact with the magnetic tape except when the magnetic tape is wound on the first hub in amount exceeding a predetermined value and the fourth tape guide is held out of contact with the magnetic tape except when the magnetic tape is wound on the second hub in amount exceeding a predetermined value, it is possible to minimize magnetic tape wear.

Preferably, the first and second corner rollers have a diameter of 8 mm or less. The diameter of the first and second corner rollers on which the drive belt is looped is 8 mm or less which is smaller than the diameter (about 11 mm) of the corner rollers of the conventional tape cartridge. Since the invention permits the magnetic tape to run with a smaller radius of curvature than does the conventional tape cartridge, it is possible to increase the belt tension (drive force) exerted on the drive belt so as to increase the tape tension exerted on the magnetic tape.

Figure 10A:
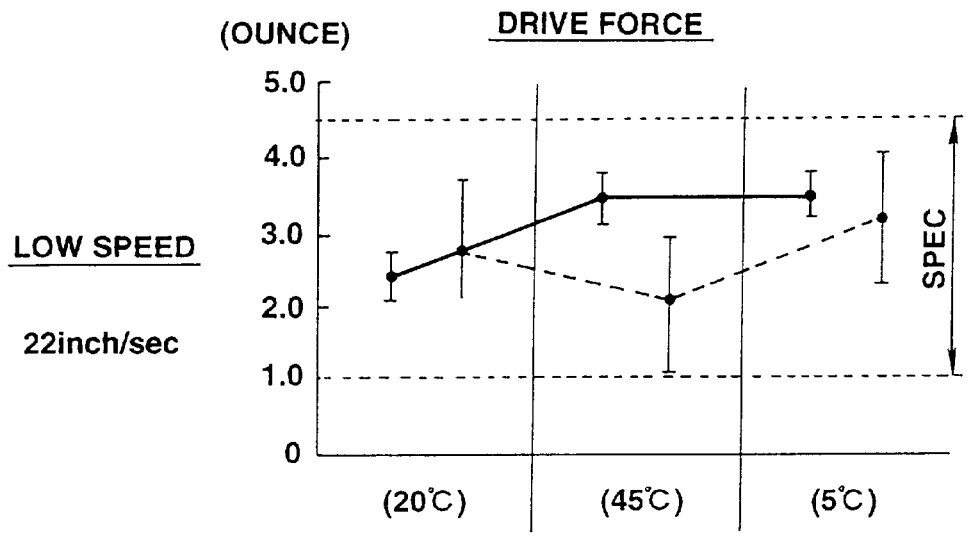
FIGS. 10A and 10B are graphs used in explaining the advantageous effect on the drive force obtainable with the use of smaller corner rollers over the conventional corner rollers.
Figure 10B:
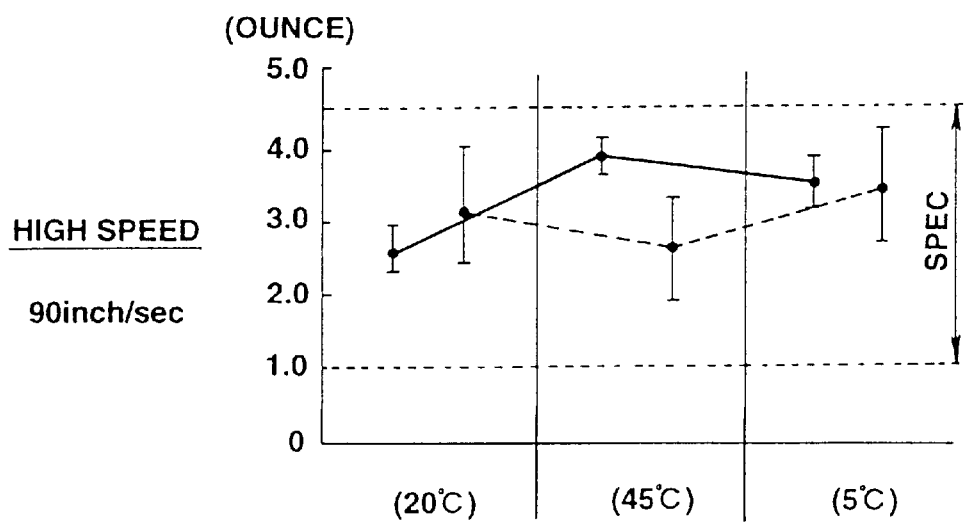

A number of tests were conducted to prove the advantageous effects on the drive force exerted on the drive belt and tape tension exerted on the magnetic tape with the use of corner rollers having a diameter of 8 mm. The drive force was measured at several temperatures including a normal temperature (20° C.), a high temperature (45° C.) and a low temperature (5° C.) for the same driving force applied to the drive capstan roller 205 of the drive unit when the magnetic tape is running at a low speed and also when the magnetic tape is running at a high speed. For comparison of the effects obtainable by the invention, tests were conducted substantially in the same manner as described above for corner rollers having a diameter of 11 mm as used in the conventional tape cartridge. The test results are illustrated in FIGS. 10A and 10B where the solid lines relate to the invention and the broken lines relate to the conventional tape cartridge. It can be seen from the test results that the invention can provide a greater and stabler drive force particularly in a temperature range of 5° C. to 45° C. than the conventional tape cartridge.

Figure 11A:
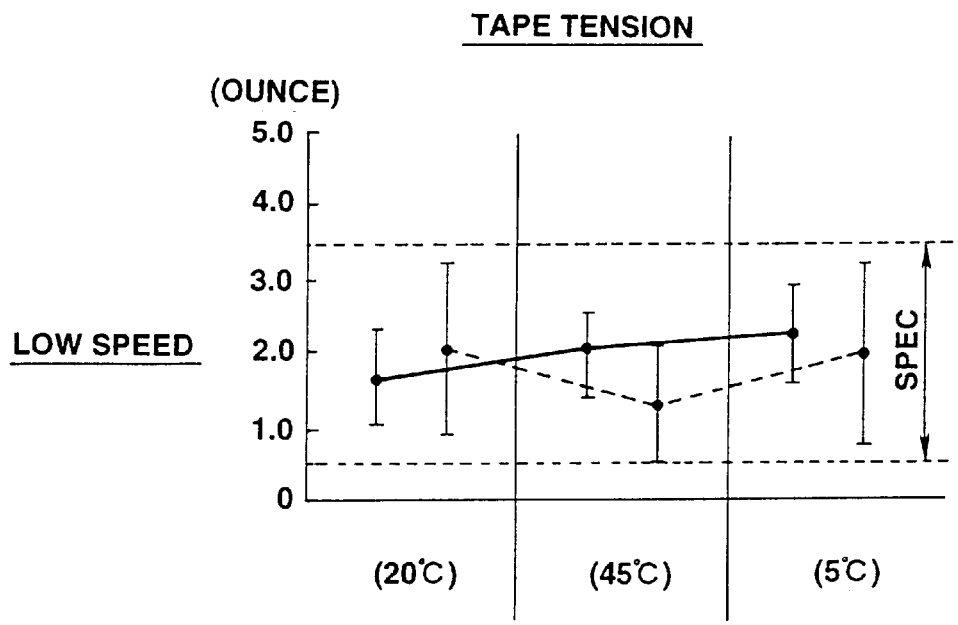
FIGS. 11A and 11B are graphs used in explaining the advantageous effect on the tape tension obtainable with the use of smaller corner rollers over the conventional corner rollers.
Figure 11B:
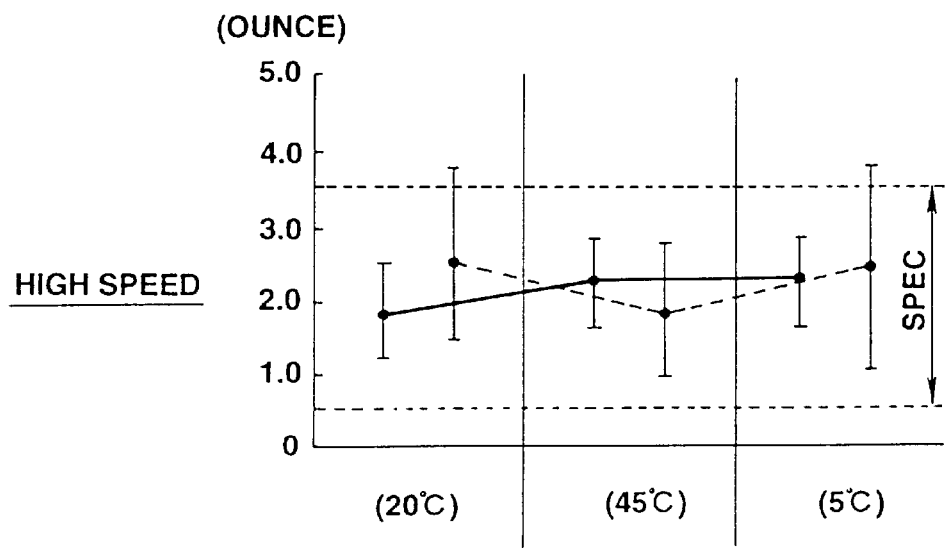

The tape tension was measured at several temperatures including a normal temperature (20° C.), a high temperature (45° C.) and a low temperature (5° C.) for the same driving force applied to the drive capstan roller 205 of the drive unit when the magnetic tape is running at a low speed and also when the magnetic tape is running at a high speed. For comparison of the effects obtainable by the invention, tests were conducted substantially in the same manner as described above for corner rollers having a diameter of 11 mm as used in the conventional tape cartridge. The test results are illustrated in FIGS. 11A and 11B where the solid lines relate to the invention and the broken lines relate to the conventional tape cartridge. It can be seen from the test results that the invention can provide a greater and stabler tape tension particularly in a temperature range of 5° C. to 45° C. than the conventional tape cartridge.

While this invention has been described in conjunction with a specific embodiment thereof, it is evident that many alternatives, modifications and variations will be apparent to those skilled in the art. For example, the first and second corner rollers 11 and 12 may have a diameter smaller than 8 mm according to the elongation percentage of the drive belt 10 determined by the material thereof and the sliding property of the rollers determined by the material (such as polyacetal or the like) thereof. Accordingly, it is intended to embrace all alternatives, modifications and variations that fall within the scope of the appended claims.

What is claimed is:

1. A tape cartridge comprising:

a base plate;

a cover fixed to the base plate to define a closed space;

a first hub mounted on the base plate for rotation about a rotation axis thereof within the closed space;

a second hub mounted on the base plate for rotation about a rotation axis thereof within the closed space;

a magnetic tape unwound from one of the first and second hubs and wound on the other hub;

first and second tape guides mounted on the base plate to guide the magnetic tape unwound from the one hub;

a drive roller mounted on the base plate between the first and second tape guides for driving a drive belt, the drive belt having a tape winding surface on which the drive belt is looped;

first and second corner rollers mounted on the base plate for guiding the drive belt, the first coner roller having a tape winding surface on which the drive belt is looped, the first coner roller being located to hold the drive belt in contact with a peripheral surface of the first hub, the second coner roller having a tape winding surface on which the drive belt is looped, the second coner roller being located to hold the drive belt in contact with a peripheral surface of the second hub;

the rotation axis of the first hub being spaced at a first distance with respect to the tape winding surface of the drive roller and at a second distance with respect to the tape winding surface of the first coner roller, the first distance being substantially equal to the second distance; and the rotation axis of the second hub being spaced at a third distance with respect to the tape winding surface of the drive roller and at a fourth distance with respect to the tape winding surface of the second coner roller, the third distance being substantially equal to the fourth distance;

wherein the cover includes:
   a wide portion having a width substantially equal to the width of the base plate,
   a narrow portion having a width smaller than the width of the base plate, and
   a stepped portion between the wide and narrow portions, the stepped portion being located between the first/second hubs and the first/second tape guides.

2. The tape cartridge as claimed in claim 1, further comprising:
   a third tape guide mounted on the base plate between the first hub and the first tape guide for preventing contact between the magnetic tape and an inner side surface of the narrow portion which would otherwise occur without the third tape guide when the magnetic tape is wound on the first hub in an amount exceeding a predetermined value; and
   a fourth tape guide mounted on the base plate between the second hub and the second tape guide for preventing contact between the magnetic tape and the inner side surface of the narrow portion which would otherwise occur without the fourth tape guide when the magnetic tape is wound on the second hub in an amount exceeding a predetermined value.

3. The tape cartridge as claimed in claim 2, wherein the third tape guide is located at a position contacting with an outer peripheral surface of the magnetic tape when the magnetic tape is wound on the first hub in amount exceeding the predetermined value and wherein the fourth tape guide is located at a position contacting with an outer peripheral surface of the magnetic tape when the magnetic tape is wound on the second hub in amount exceeding the predetermined value.

4. The tape cartridge as claimed in claim 1, wherein the first and second corner rollers have a diameter of substantially 8 mm.

* * * * *

UNITED STATES PATENT AND TRADEMARK OFFICE
CERTIFICATE OF CORRECTION

PATENT NO. : 6,282,058 B1
DATED : August 28, 2001
INVENTOR(S) : Yuji Iwaki

Page 1 of 1

It is certified that error appears in the above-identified patent and that said Letters Patent is hereby corrected as shown below:

<u>Column 9,</u>
Line 3, change "comer" to -- corner --;
Line 4, change "coner" to -- corner --;
Line 6, change "coner" to -- corner --;
Line 8, change "coner" to -- corner --;
Line 10, change "coner" to -- corner --;
Line 15, change "coner" to -- corner --;
Line 21, change "coner" to -- corner --;

<u>Column 10,</u>
Line 30, insert -- or less -- after "8mm".

Signed and Sealed this

Twenty-eighth Day of May, 2002

Attest:

Attesting Officer

JAMES E. ROGAN
Director of the United States Patent and Trademark Office